(12) United States Patent
Cohen

(10) Patent No.: US 8,155,457 B2
(45) Date of Patent: Apr. 10, 2012

(54) ROBUST ENCODING OF METADATA IN LOSSY ENCODED IMAGES

(75) Inventor: Benjamin M. Cohen, DN Misgav (IL)

(73) Assignee: International Business Machines Corporation Corporation, Armonk, NY (US)

( * ) Notice: Subject to any disclaimer, the term of this patent is extended or adjusted under 35 U.S.C. 154(b) by 727 days.

(21) Appl. No.: 12/272,818

(22) Filed: Nov. 18, 2008

(65) Prior Publication Data

US 2010/0124353 A1    May 20, 2010

(51) Int. Cl.
    *G06K 9/36* (2006.01)
(52) U.S. Cl. ......... 382/232; 382/240; 382/187; 382/188
(58) Field of Classification Search .................. 382/232, 382/240, 100, 188, 187; 455/179.1, 150.1; 345/179; 717/137; 707/E17.006
    See application file for complete search history.

(56) References Cited

U.S. PATENT DOCUMENTS

| | | | |
|---|---|---|---|
| 5,119,465 A * | 6/1992 | Jack et al. | 717/137 |
| 2006/0039617 A1 | 2/2006 | Makai et al. | 375/240.26 |
| 2008/0025649 A1 | 1/2008 | Liu et al. | 382/254 |
| 2008/0063287 A1 | 3/2008 | Klamer et al. | 382/232 |

* cited by examiner

*Primary Examiner* — Anh Hong Do
(74) *Attorney, Agent, or Firm* — Dan Swirsky

(57) ABSTRACT

Processing an image with embedded metadata by determining an integer value of a byte and separate the integer value into a plurality of digits, converting each of the digits into an encoding value using a predefined conversion function, selecting a pixel block in a metadata container, encoding into the selected pixel block each of the encoding values, and after the pixel block is encoded using a lossy compression scheme and subsequently decoded into raw pixel data, extracting the metadata from the raw pixel data, and performing at least one predefined action using the metadata.

18 Claims, 7 Drawing Sheets

ROBUST ENCODING OF METADATA IN LOSSY ENCODED IMAGES

FIELD OF THE INVENTION

The present invention relates to image processing in general, and more particularly to encoding metadata in images.

BACKGROUND OF THE INVENTION

Some computer-based applications that process images provide no facility for receiving non-pixel-related data, hereinafter referred to as "metadata," that may be used to control how an image is to be processed. As shown by way of example in FIG. 1, an image 100 is sent from a computer 102 via a computer network 104, such as the Internet, to a server 106. In the example shown in FIG. 1, image 100 is encoded using a lossy compression scheme, such as JPEG. Image 100 is decoded by an image decoder 108 into raw pixel data encoded in RGB (3 bytes of 8 bits each) color format, and the raw pixel data is provided to some element that then processes the pixel values, typically for display, such as to a rendering engine 110 that is, for example, capable of implementing the OpenGL standard, which renders the image.

It may be advantageous to include metadata along with the raw pixel data that is provided to engine 110. However, if the image data is passed to a lower level OpenGL rendering engine, that layer has no access to any metadata which is related to the RGB pixel values. Thus, as the OpenGL specification does not make provisions for receiving metadata, any metadata would have to be embedded within the pixel data of image 100. Unfortunately, as images are typically compressed using lossy compression before they are seen by the OpenGL layer, any embedded metadata may be corrupted before being made available to the OpenGL layer for inspection.

SUMMARY OF THE INVENTION

The present invention in embodiments thereof discloses novel systems and methods for encoding metadata in lossy encoded images.

In one aspect of the present invention a system is provided for processing an image with embedded metadata, the system including a digit separator configured to determine an integer value of a byte and separate the integer value into a plurality of digits, a digit converter configured to convert each of the digits into an encoding value using a predefined conversion function, a pixel block selector configured to select a pixel block in a metadata container, and a pixel value setter configured to encode into the selected pixel block each of the encoding values, where any of the digit separator, digit converter, pixel block selector, and pixel value setter are implemented in either of computer hardware and computer software and embodied in a computer-readable medium.

In another aspect of the present invention the pixel block includes a plurality of pixels, where each of the pixels includes a plurality of color component values, and where the pixel value setter is configured to encode the encoding values of each of the digits into corresponding ones of the color component values of each of the pixels in the block.

In another aspect of the present invention the color component values are RGB triplets.

In another aspect of the present invention the system further includes means to encode the metadata container using a lossy compression scheme.

In another aspect of the present invention the lossy compression scheme is JPEG.

In another aspect of the present invention the conversion function multiplies any of the digits by 20 and adds 10 to the product of the multiplication.

In another aspect of the present invention the system further includes a pixel block selector configured to select a pixel block from raw pixel data from which to decode metadata, a pixel value getter configured to select any pixel in the selected pixel block and retrieve color component values of the selected pixel, a byte value calculator configured to determine the integer value for the byte by applying a predefined reconversion function to the color component values, and a metadata interpreter configured to determine whether the byte is metadata, interpret the metadata, determine whether a predefined action should be performed using the metadata, and perform the predefined action.

In another aspect of the present invention the system further includes a value converter configured to average color component values of a plurality of selected pixels in a predefined region of the selected pixel block, and create a single set of averaged pixel color component values from the average of the color component values of each of the pixels in the predefined region, where the byte value calculator is configured to determine the integer value from the set of averaged pixel color component values.

In another aspect of the present invention the byte value calculator is configured to determine the integer value by dividing each of the averaged color component values by 20 and multiplying an integer portion of one of the division results corresponding to a hundreds digit of the averaged color component values by 100 and an integer portion of one of the division results corresponding to a tens digit of the averaged color component values by 10 and then adding the products of the multiplications to an integer portion of one of the division results corresponding to a ones digit of the color component values.

In another aspect of the present invention a system is provided for processing an image with embedded metadata, the system including a metadata encoder configured to encode one or more bytes of metadata into image pixels of metadata container prior to the metadata container being encoded using a lossy compression scheme and subsequently decoded into raw pixel data, and a metadata processor configured to extract the metadata from the raw pixel data and perform at least one predefined actions using the metadata.

In another aspect of the present invention a method is provided for processing an image with embedded metadata, the method including determining an integer value of a byte and separate the integer value into a plurality of digits, converting each of the digits into an encoding value using a predefined conversion function, selecting a pixel block in a metadata container, and encoding into the selected pixel block each of the encoding values.

In another aspect of the present invention a method is provided for processing an image with embedded metadata, the method including encoding one or more bytes of metadata into image pixels prior to the image pixels being encoded using a lossy compression scheme and subsequently decoded into raw pixel data, extracting the metadata from the raw pixel data, and performing at least one predefined action using the metadata.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1:
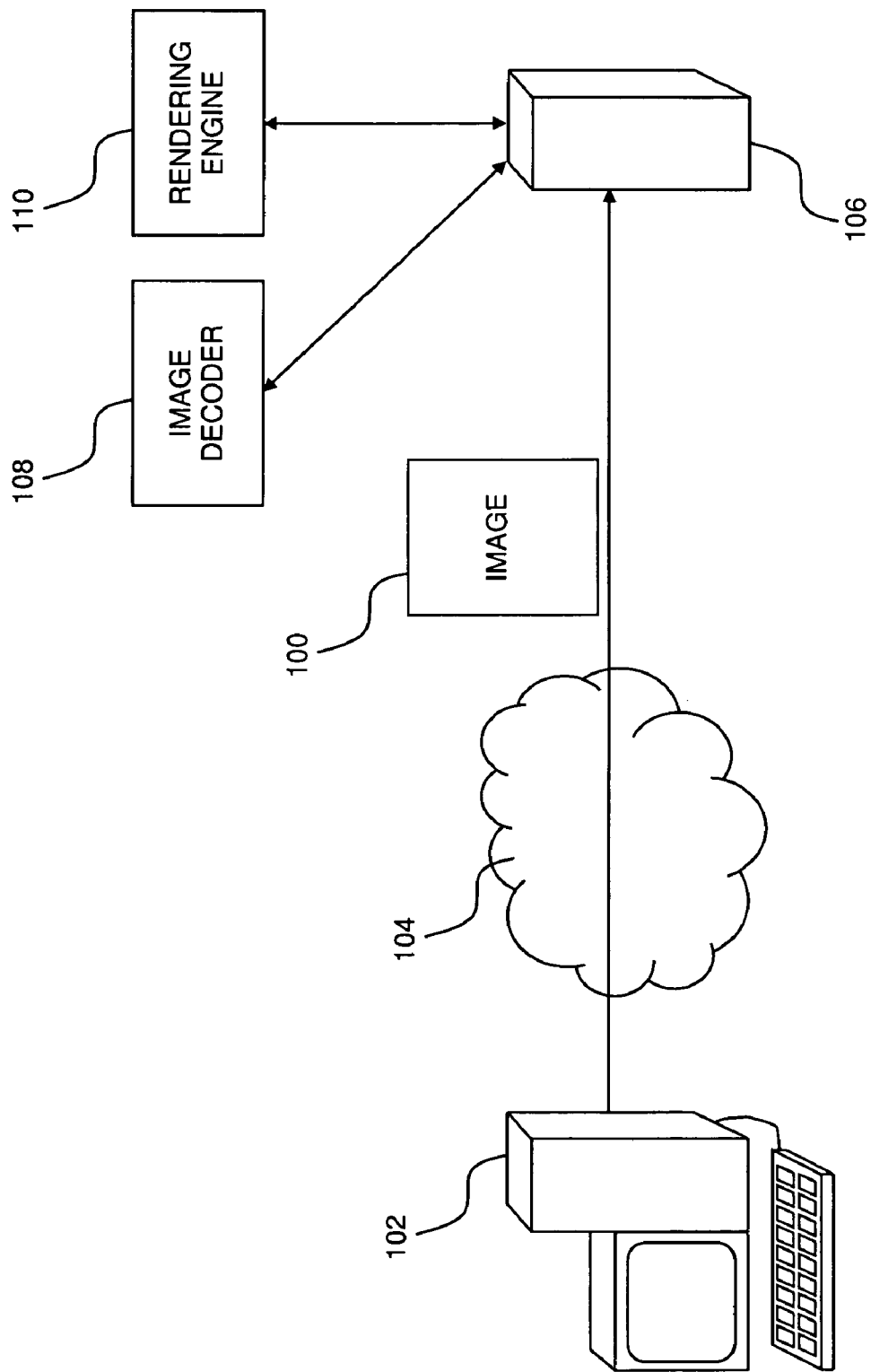
FIG. 1 is a simplified conceptual illustration of an image processing system, useful in understanding the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
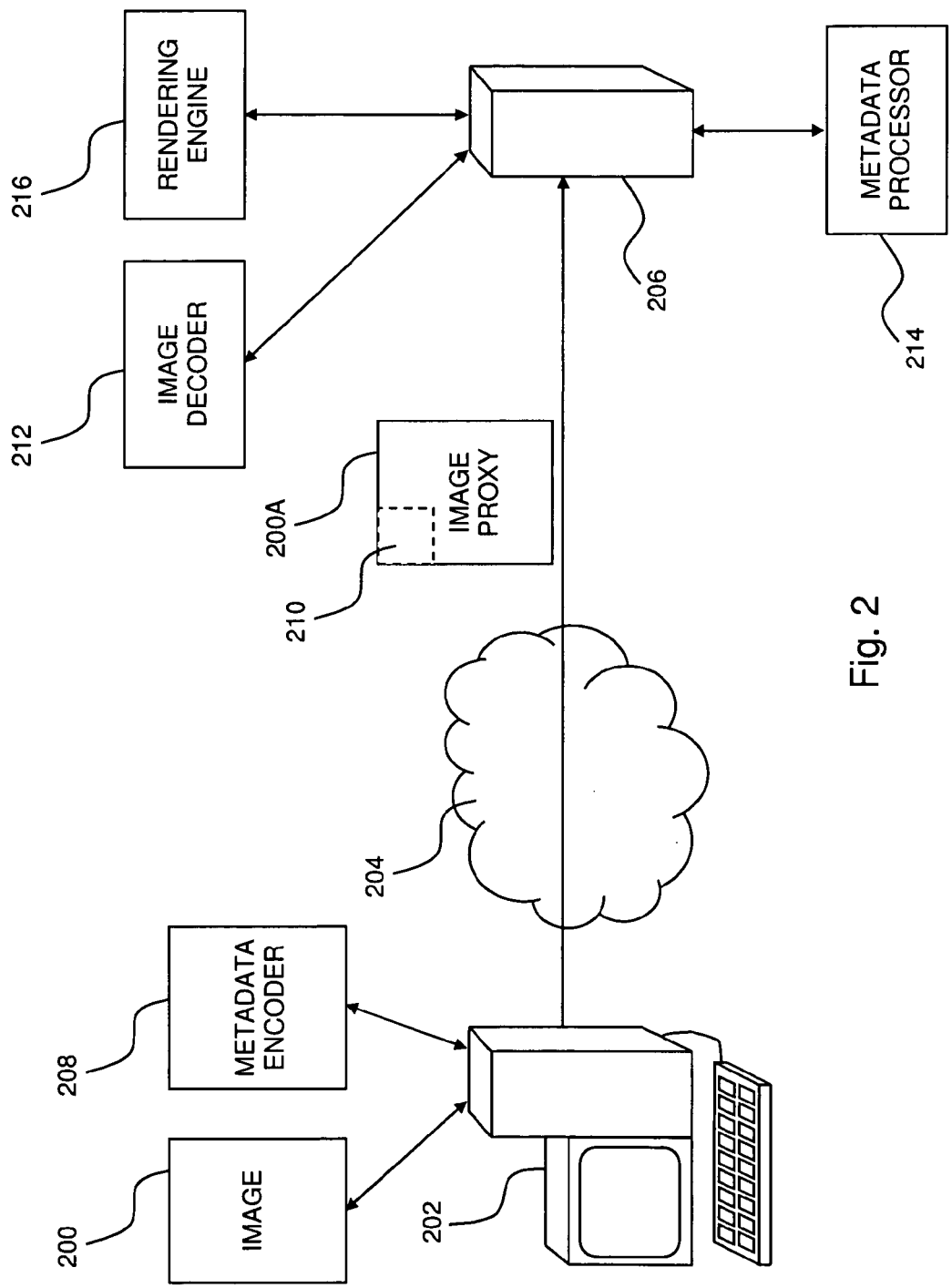
FIG. 2 is a simplified conceptual illustration of a system for processing an image with embedded metadata, constructed and operative in accordance with an embodiment of the present invention.

Reference is now made to FIG. 2 which is a simplified conceptual illustration of a system for processing an image with embedded metadata, constructed and operative in accordance with an embodiment of the present invention. In the system of FIG. 2, and in contrast to the system of FIG. 1, instead of or in addition to sending an image 200 from a computer 202 via a computer network 204, such as the Internet, to a server 206, computer 202 creates a metadata container 200A, which may be a copy of image 200 or another image or may be an image facsimile, having the same dimensions and color depth as image 200, but preferably with the pixel values set to zero or any other predetermined value. A metadata encoder 208 encodes one or more bytes of metadata into metadata container 200A. In one embodiment encoder 208 encodes a fixed header string into metadata container 200A followed by one or more bytes of additional metadata, such as including a URL indicating the location of image 200.

Encoder 208 preferably takes the integer value of a byte of metadata to be encoded, separates the integer value into ones, tens, and hundreds digits, converts each digit into an encoding value, and encodes each encoding value into a pixel block of metadata container 200A. For example, a byte to be encoded represents the letter 'A', having an integer value of 065 in ASCII code. The hundreds digit '0', the tens digit '6', and the ones digit '5' of the integer value are converted into separate encoding values using predefined conversion functions to create a triplet of encoding values. An 8×8 pixel block 210 of metadata container 200A is selected, and the color component (e.g., RGB triplet) values of each pixel in block 210 are correspondingly set equal to the encoding value triplet. Thus, for example, where each pixel in block 210 is represented by an RGB triplet, the red, green, and blue values of each pixel in block 210 are set to the encoding values of the hundreds, tens, and ones digits respectively of the letter 'A'. Subsequent bytes are likewise processed and encoded into subsequent pixel blocks of metadata container 200A. Preferably, for each byte of metadata being encoded, the encoding value of a given digit type (e.g., hundreds) is encoded to the same color component type (e.g., red).

Metadata container 200A is encoded, such as by computer 202 prior to sending metadata container 200A, using a lossy compression scheme, such as JPEG. Metadata container 200A is sent from computer 202 via computer network 204 to server 206. Metadata container 200A is decoded by an image decoder 212 into raw pixel data, such as being encoded in RGB (3 bytes of 8 bits each) color format.

Prior to rendering the raw pixel data, a metadata processor 214 inspects the raw pixel data to determine if the raw pixel data includes embedded metadata. In one embodiment, processor 214 checks for the presence of the fixed header string described above, where the fixed header string is known to processor 214. If no fixed header string is found, the raw pixel data is provided to a rendering engine 216, such as is capable of implementing the OpenGL standard, which renders the image. If the fixed header string is found, processor 214 preferably retrieves any additional metadata that may be embedded in the raw pixel data and performs one or more predefined actions using the metadata. For example, if the metadata is a URL indicating the location of image 200, processor 214 may retrieve image 200 and provide the retrieved image to engine 216. In this scenario images may be dynamically substituted just prior to rendering. Additionally or alternatively, any known technique may be used to determine if a computer user to whom image 200 is to be presented is authorized to view image 200. If the recipient is not authorized to view image 200, a predefined action may be taken instead of rendering and presenting image 200, such as by presenting a substitute image.

Figure 3:
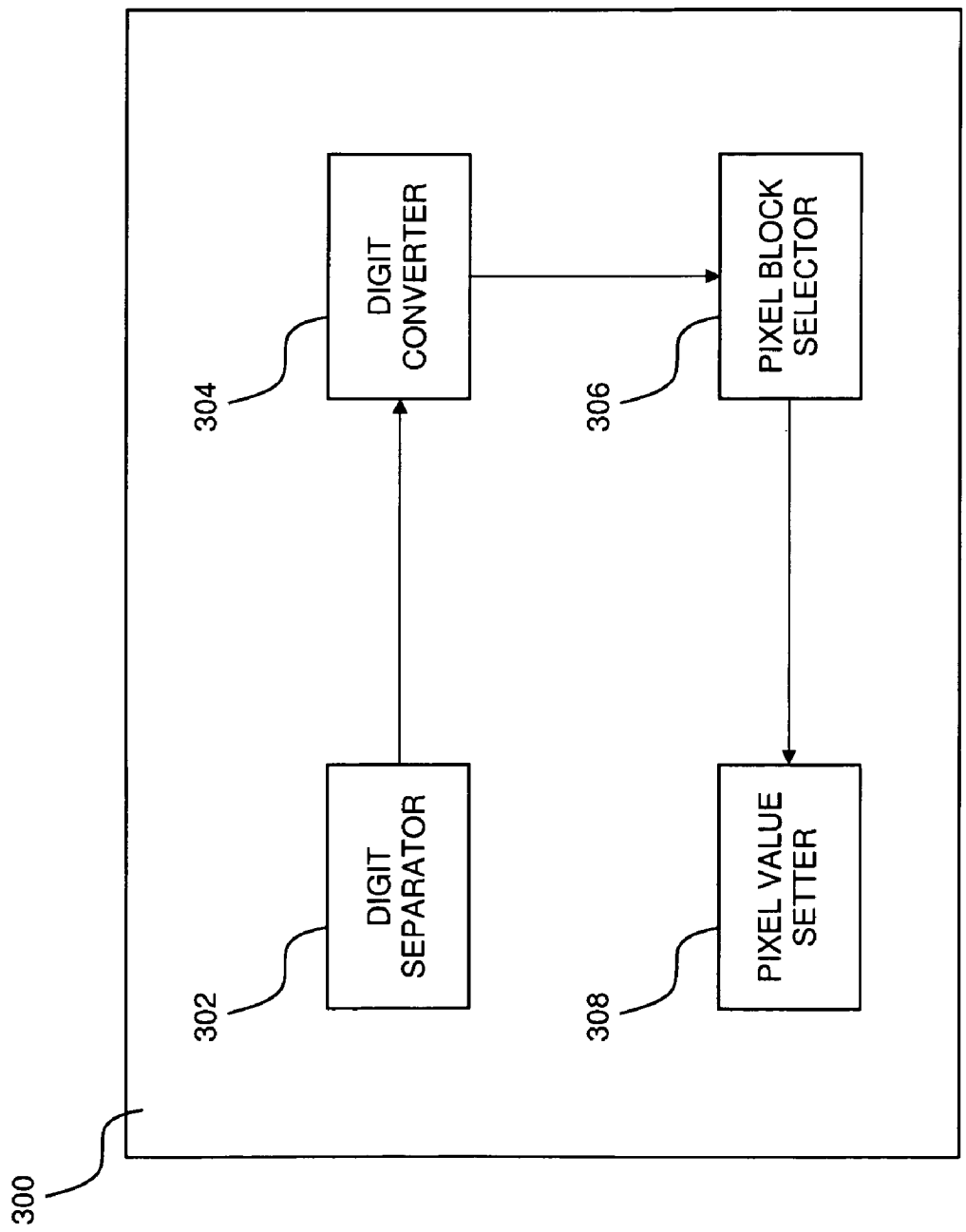
FIG. 3 is a simplified conceptual illustration of an encoder, constructed and operative in accordance with an embodiment of the present invention.

Reference is now made to FIG. 3 which is a simplified conceptual illustration of an encoder, constructed and operative in accordance with an embodiment of the present invention. In the system of FIG. 3 an encoder 300, such as may be used for metadata encoder 208 of FIG. 2, includes a digit separator 302, a digit converter 304, a pixel block selector 306, and a pixel value setter 308. Digit separator 302 determines the integer value an incoming byte and separates the integer value into ones, tens, and hundreds digits. Digit converter 304 converts each digit into an encoding value using a predefined conversion function which may be the same for all digits or different for each digit. Pixel block selector 306 selects the pixel blocks in a metadata container in which to encode metadata, selecting a different pixel block for each byte of metadata to be encoded. Pixel value setter 308 encodes into the selected pixel block each encoding value of a byte to be encoded.

Figure 4:
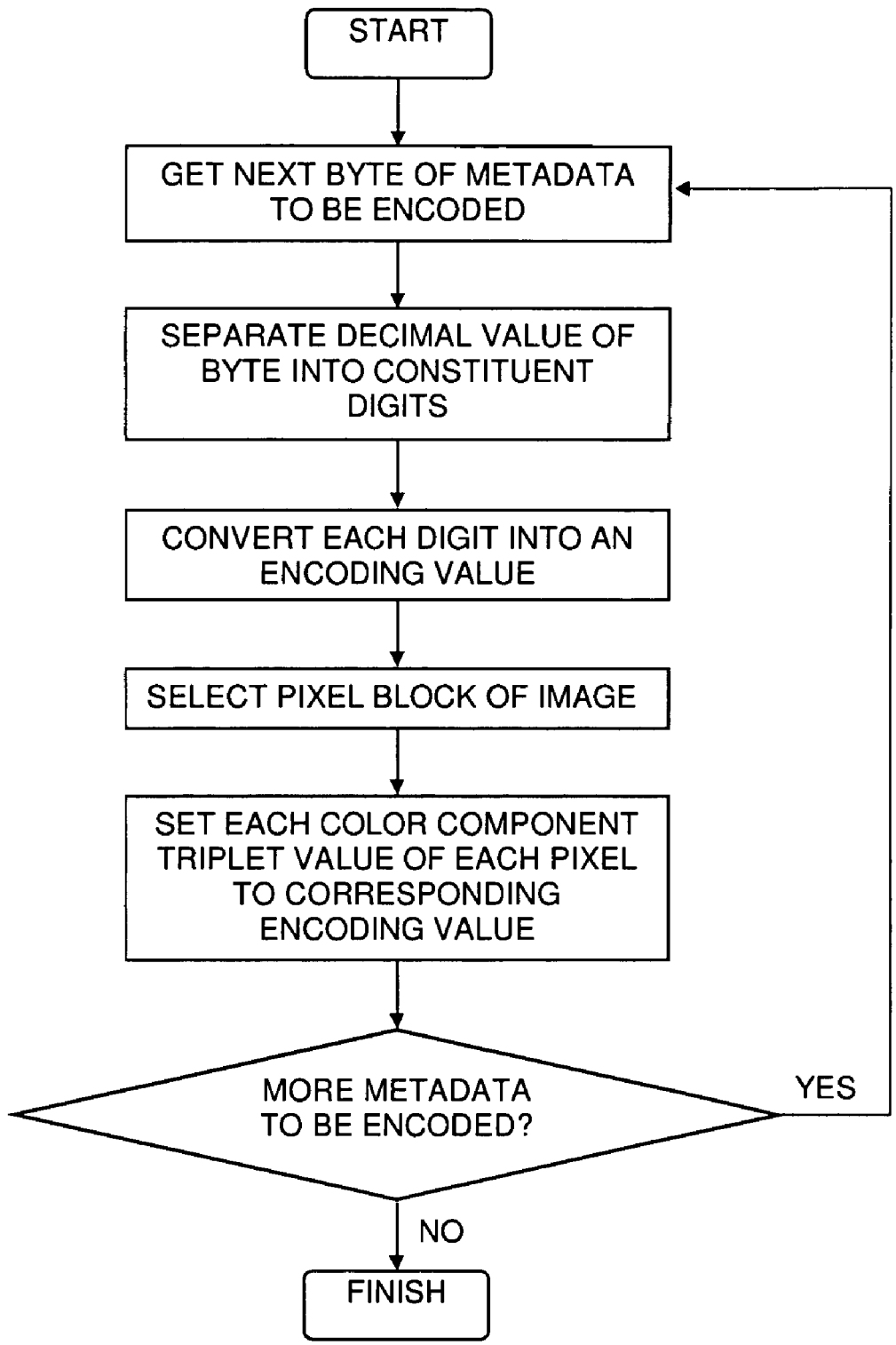
FIG. 4 is a simplified flowchart illustration of an exemplary method of operation of encoder 300 of FIG. 3, operative in accordance with an embodiment of the present invention.

Reference is now made to FIG. 4 which is a simplified flowchart illustration of an exemplary method of operation of encoder 300 of FIG. 3, operative in accordance with an embodiment of the present invention. In the method of FIG. 4 the integer value of a byte to be encoded is separated into its constituent hundreds, tens, and ones digits. Each digit is converted into an encoding values using a predefined conversion function, producing an encoding value triplet. In one embodiment, the same conversion function is used for each of the digits, where each digit is multiplied by 20 and 10 is added to the product. For example, where the byte will be encoded into a pixel having RGB color component values, the R component for the letter 'A' would be (0×20)+10=10, the G component would be (6×20)+10=130, and the B component (5×20)+10=110. A pixel block of a metadata container is selected, and the color component values of each pixel in the block are correspondingly set equal to the encoding value triplet. If there are more bytes of metadata to be encoded into the image, subsequent bytes are likewise processed and encoded into subsequent pixel blocks.

It has been found through experimentation that when metadata are encoded into an image in accordance with the metadata encoder and method of FIGS. 3 and 4, and thereafter the image is encoded using any lossy encoding technique, such as JPEG, and subsequently decoded, the metadata survives the lossy encoding and decoding with little or no detectable corruption when extracted from the image in accordance with the metadata processor and method of FIGS. 5 and 6.

Figure 5:
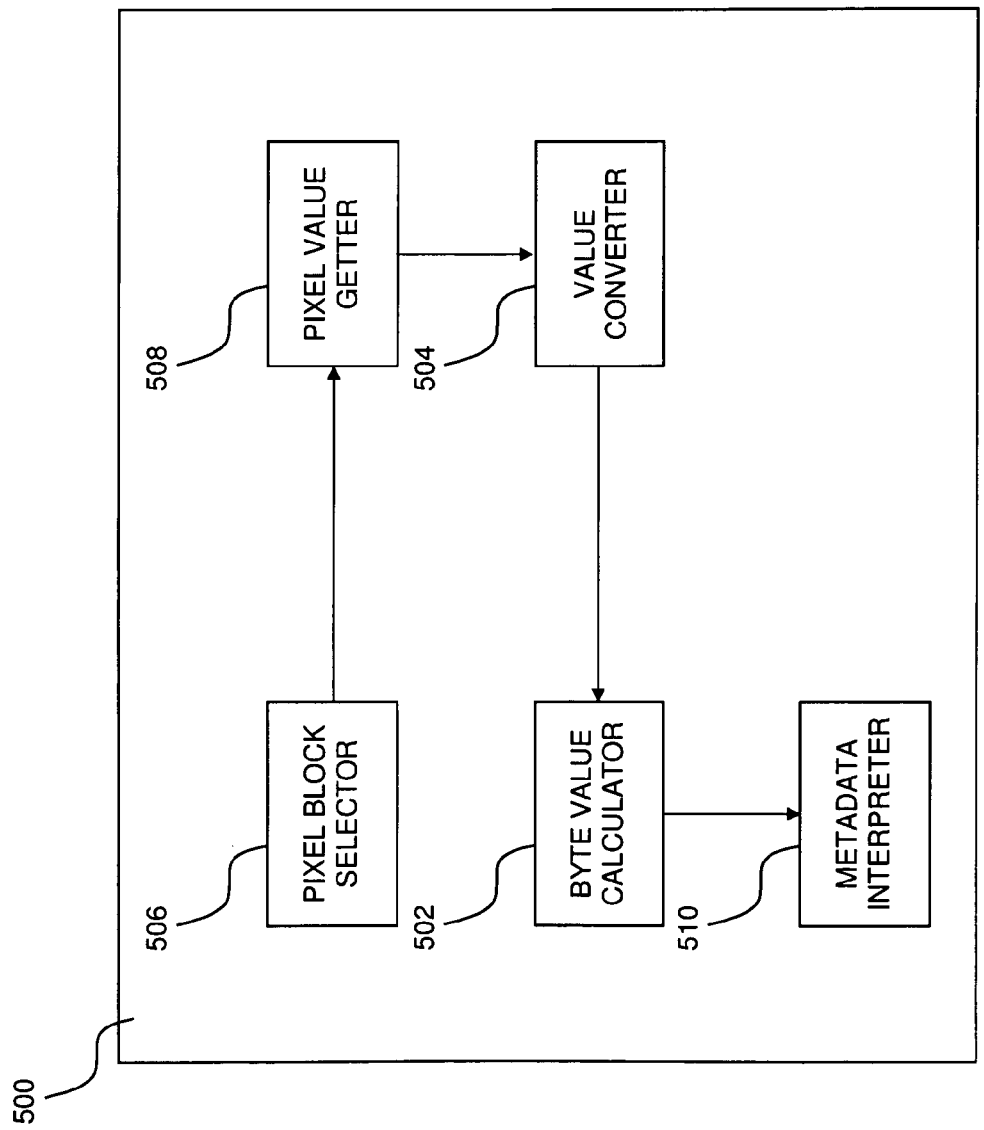
FIG. 5 is a simplified conceptual illustration of a metadata processor, constructed and operative in accordance with an embodiment of the present invention.

Reference is now made to FIG. 5 which is a simplified conceptual illustration of a metadata processor, constructed and operative in accordance with an embodiment of the present invention. In the system of FIG. 5 a metadata processor 500, such as may be used for metadata processor 214 of FIG. 2, includes a byte value calculator 502, a value converter 504, a pixel block selector 506, a pixel value getter 508, and a metadata interpreter 510. Pixel block selector 506 selects the pixel blocks in raw pixel data from which to decode metadata, selecting a different pixel block for each byte of metadata to be decoded. Pixel value getter 508 selects each of the pixels in a predefined region of the selected pixel block and gets the color component values of each pixel. Value converter 504 averages the color component values of each of the pixels in the predefined region, such as by averaging all of the R values into a single R value, and similarly for the G and B values, to create a single set of averaged color component values. Byte value calculator 502 determines a single integer value for an encoded byte by applying a predefined reconversion function to the set of averaged color component values which may be the same or different function for each color component value. Metadata interpreter 510 determines whether the decoded data is indeed metadata, interprets any decoded metadata, determines whether one or more predefined actions should be performed using the metadata, and performs the actions.

Figure 6:
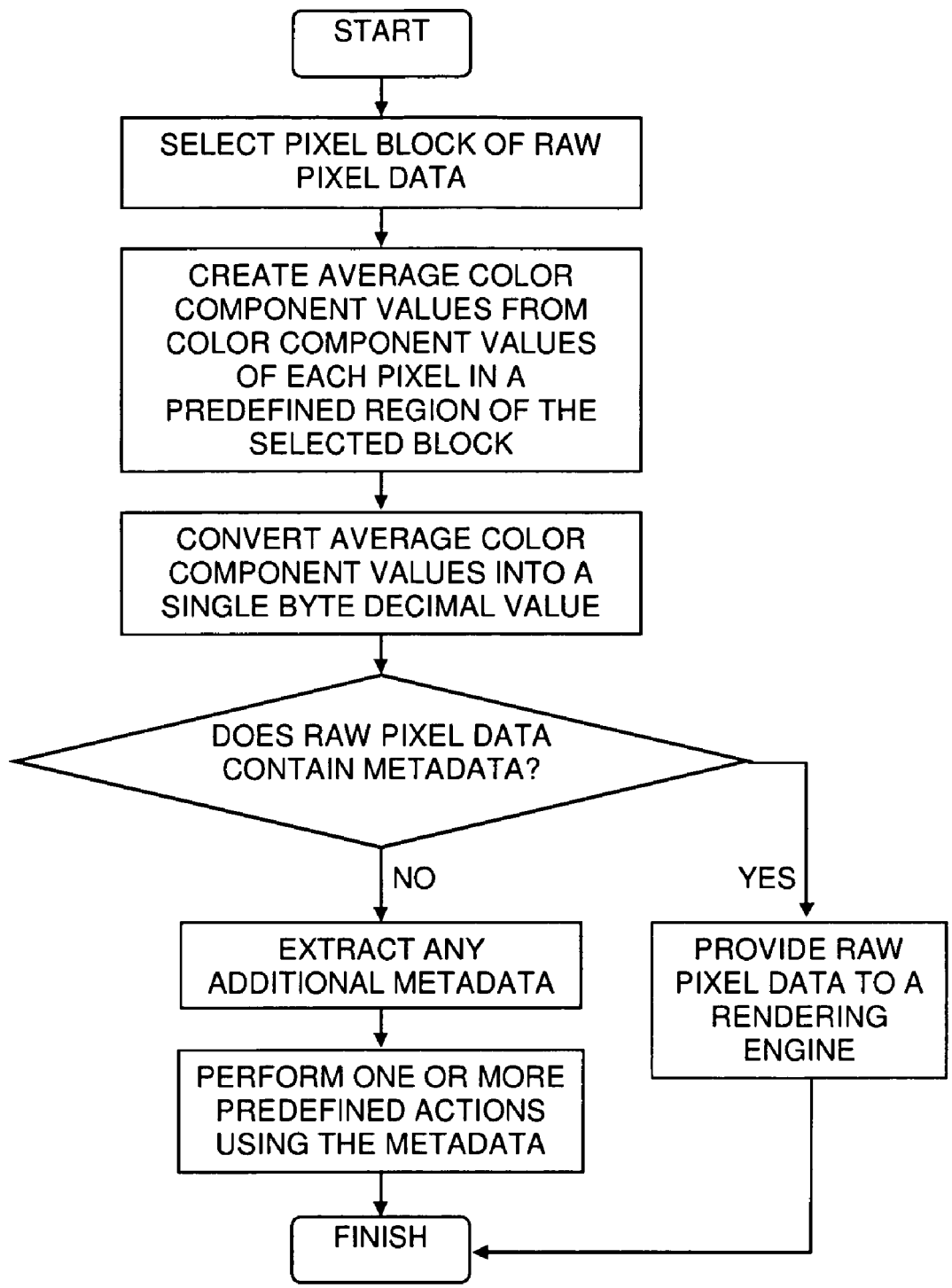
FIG. 6 is a simplified flowchart illustration of an exemplary method of operation of metadata processor 500 of FIG. 5, operative in accordance with an embodiment of the present invention.

Reference is now made to FIG. 6 which is a simplified flowchart illustration of an exemplary method of operation of metadata processor 500 of FIG. 5, operative in accordance with an embodiment of the present invention. In the method of FIG. 6 a pixel block of raw pixel data is selected, and the color component values of each of the pixels in a predefined region of the block are averaged into a single triplet whose values are then converted into values using predefined reconversion functions. In one embodiment, the predefined region is defined by the 16 most central pixels in an 8×8 pixel block whose color component values are averaged to create a set of averaged color component values. For example, where the color component values are RGB values, the averaged color component values are converted into a single value using the formula (Floor(R/20)*100)+(Floor(G/20)*10)+(Floor(B/20)) representing the value of a byte of metadata. For example, where the average color component values are 011, 128, and 112 respectively after JPEG decoding, they are converted into a single value using the formula (Floor(011/20)*100)+(Floor(128/20)*10)+(Floor(112/20)) to form the value '065' which represents the letter 'A' in ASCII code. If there are more bytes of metadata to be decoded from the image, subsequent bytes are likewise decoded from subsequent pixel blocks.

If it is determined that the raw pixel data contains metadata, such as if the decoded byte integer values constitute a known fixed header string, then the raw pixel data are that of a metadata container. Otherwise, the raw pixel data may be provided to a rendering engine. If the raw pixel data are that of a metadata container, any additional metadata that may be embedded in the raw pixel data are extracted, and one or more predefined actions using the metadata are preferably performed.

Figure 7:
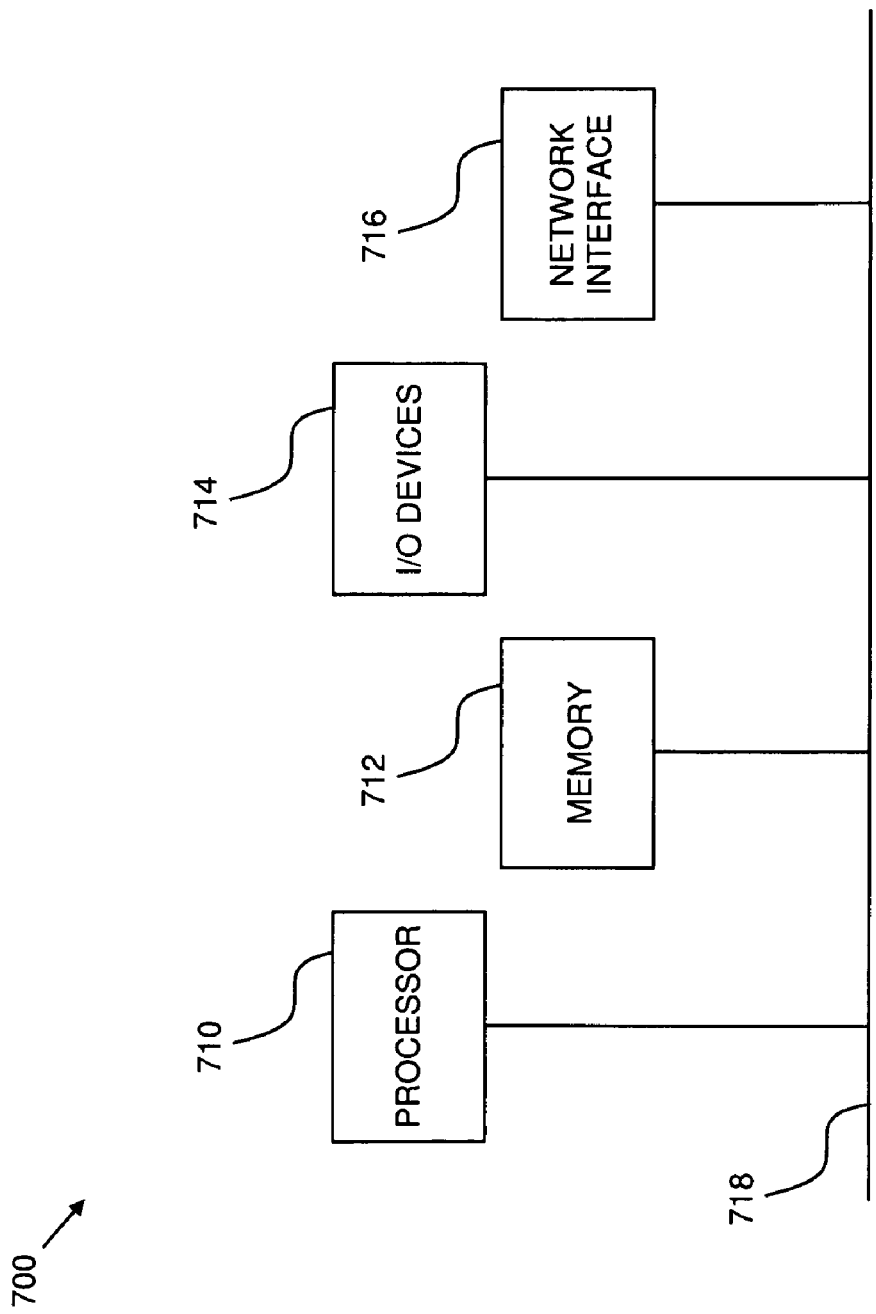
FIG. 7 is a simplified block diagram illustration of an exemplary hardware implementation of a computing system, constructed and operative in accordance with an embodiment of the present invention.

Referring now to FIG. 7, block diagram 700 illustrates an exemplary hardware implementation of a computing system in accordance with which one or more components/methodologies of the invention (e.g., components/methodologies described in the context of FIGS. 1-6) may be implemented, according to an embodiment of the present invention.

As shown, the techniques for controlling access to at least one resource may be implemented in accordance with a processor 710, a memory 712, I/O devices 714, and a network interface 716, coupled via a computer bus 718 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for processing an image with embedded metadata, the system comprising:
    a digit separator configured to determine an integer value of a byte and separate said integer value into a plurality of digits;
    a digit converter configured to convert each of said digits into an encoding value using a predefined conversion function;
    a pixel block selector configured to select a pixel block in a metadata container; and
    a pixel value setter configured to encode into said selected pixel block each of said encoding values,
    wherein any of said digit separator, digit converter, pixel block selector, and pixel value setter are implemented in either of computer hardware and computer software and embodied in a computer-readable medium.

2. A system according to claim 1 wherein said pixel block comprises a plurality of pixels, wherein each of said pixels comprises a plurality of color component values, and wherein said pixel value setter is configured to encode said encoding values of each of said digits into corresponding ones of said color component values of each of said pixels in said block.

3. A system according to claim 2 wherein said color component values are RGB triplets.

4. A system according to claim 1 and further comprising means to encode said metadata container using a lossy compression scheme.

5. A system according to claim 4 wherein said lossy compression scheme is JPEG.

6. A system according to claim 1 wherein said conversion function multiplies any of said digits by 20 and adds 10 to the product of said multiplication.

7. A system according to claim 1 and further comprising:
    a pixel block selector configured to select a pixel block from raw pixel data from which to decode metadata;
    a pixel value getter configured to select any pixel in said selected pixel block and retrieve color component values of said selected pixel;
    a byte value calculator configured to determine said integer value for said byte by applying a predefined reconversion function to said color component values; and a metadata interpreter configured to
   determine whether said byte is metadata,
   interpret said metadata,
   determine whether a predefined action should be performed using said metadata, and
   perform said the predefined action.

8. A system according to claim 7 and further comprising a value converter configured to average color component values of a plurality of selected pixels in a predefined region of said selected pixel block, and create a single set of averaged pixel color component values from the average of the color component values of each of said pixels in said predefined region, wherein said byte value calculator is configured to determine said integer value from said set of averaged pixel color component values.

9. A system according to claim 8 wherein said byte value calculator is configured to determine said integer value by dividing each of said averaged color component values by 20 and multiplying an integer portion of one of said division results corresponding to a hundreds digit of said averaged color component values by 100 and an integer portion of one of said division results corresponding to a tens digit of said averaged color component values by 10 and then adding the products of said multiplications to an integer portion of one of said division results corresponding to a ones digit of said color component values.

10. A system for processing an image with embedded metadata, the system comprising:
   a metadata encoder configured to encode one or more bytes of metadata into image pixels of metadata container prior to said metadata container being encoded using a lossy compression scheme and subsequently decoded into raw pixel data; and
   a metadata processor configured to extract said metadata from said raw pixel data and perform at least one predefined actions using said metadata.

11. A computer-implemented method performed by a processor for processing an image with embedded metadata, the method comprising:
   Determining an integer value of a byte and separate said integer value into a plurality of digits;
   converting each of said digits into an encoding value using a predefined conversion function;
   selecting a pixel block in a metadata container; and
   encoding into said selected pixel block each of said encoding values.

12. A method according to claim 11 and further comprising encoding said metadata container using a lossy compression scheme.

13. A method according to claim 12 wherein said lossy compression scheme is JPEG.

14. A method according to claim 11 wherein said converting step comprises multiplying any of said digits by 20 and adding 10 to the product of said multiplication.

15. A method according to claim 11 and further comprising:
   selecting a pixel block from raw pixel data from which to decode metadata;
   selecting any pixel in said selected pixel block and retrieving color component values of said selected pixel;
   determining said integer value for said byte by applying a predefined reconversion function to said color component values;
   determining whether said byte is metadata;
   interpreting said metadata;
   determining whether a predefined action should be performed using said metadata; and
   performing said the predefined action.

16. A method according to claim 15 and further comprising averaging said color component values of a plurality of selected pixels in a predefined region of said selected pixel block into a single set of averaged color component values, wherein said determining said integer value step comprises determining said integer value from said set of averaged pixel color component values.

17. A method according to claim 16 wherein said determining said integer value step comprises dividing each of said averaged color component values by 20 and multiplying an integer portion of one of said division results corresponding to a hundreds digit of said averaged color component values by 100 and an integer portion of one of said division results corresponding to a tens digit of said averaged color component values by 10 and then adding the products of said multiplications to an integer portion of one of said division results corresponding to a ones digit of said color component values.

18. A computer-implemented method performed by a processor for processing an image with embedded metadata, the method comprising:
   encoding one or more bytes of metadata into image pixels prior to said image pixels being encoded using a lossy compression scheme and subsequently decoded into raw pixel data;
   extracting said metadata from said raw pixel data; and
   performing at least one predefined action using said metadata.

* * * * *